No. 627,273. Patented June 20, 1899.
B. F. SEIBERT.
RIGID BAIL FOR COAL SCUTTLES OR OTHER RECEPTACLES.
(Application filed Oct. 15, 1898.)
(No Model.)
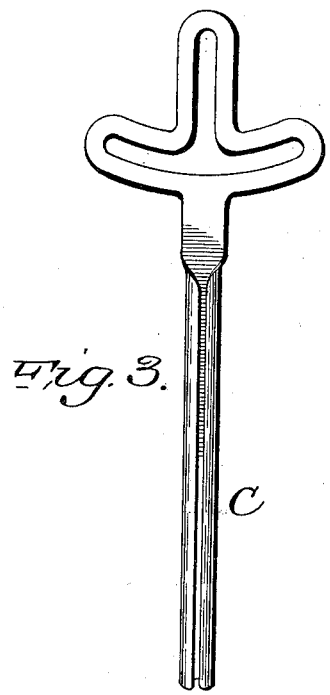
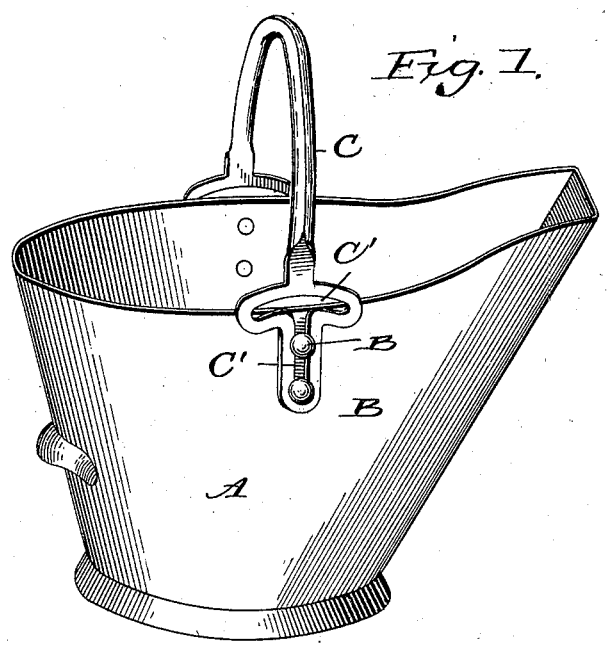
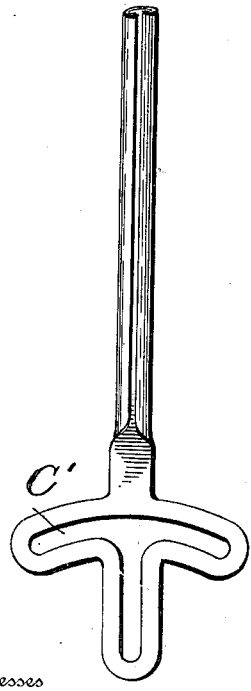
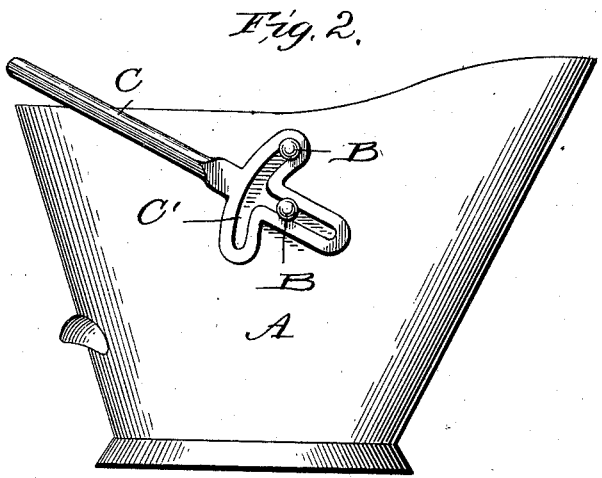

UNITED STATES PATENT OFFICE.

BENNETT F. SEIBERT, OF MANSFIELD, OHIO.

RIGID BAIL FOR COAL-SCUTTLES OR OTHER RECEPTACLES.

SPECIFICATION forming part of Letters Patent No. 627,273, dated June 20, 1899.

Application filed October 15, 1898. Serial No. 693,661. (No model.)

*To all whom it may concern:*

Be it known that I, BENNETT F. SEIBERT, a citizen of the United States, residing at Mansfield, in the county of Richland and State of Ohio, have invented certain new and useful Improvements in Rigid Bails for Coal-Scuttles or other Receptacles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in bails for buckets, coal-scuttles, &c., and especially to the provision of a rigid or stiff joint for the same, whereby should the contents of the receptacle be unequally balanced in the same the handle or bail will prevent any tilting of the receptacle while being carried.

More specifically my invention resides in the provision of a bail adapted especially for coal-scuttles, in which bail at its ends are provided slots, in which are mounted headed rivets which prevent any tilting of the scuttle while being carried, but which will allow the bail to be tilted and held at a different angle when the contents of the receptacle are being emptied, and which bail will fall back by gravity against the top of the scuttle when set down.

To these ends and to such others as the invention may pertain the same consists, further, in the novel construction and arrangement of parts, which will be hereinafter more specifically described, and defined in the appended claims.

My invention is clearly illustrated in the accompanying drawings, which, with the letters of reference marked thereon, form a part of this application, and in which drawings—

Figure 1 is a perspective view of my improved bail shown as attached to a coal-scuttle, the bail being shown in the position which it assumes when the scuttle is being carried, in which position the scuttle is prevented from tilting should its contents be unequally balanced in the scuttle. Fig. 2 is a perspective view showing the bail tilted back in a position in which the contents of the scuttle may be readily emptied, the bail being shown in the position that it would assume when the bucket is not being carried. Fig. 3 is an enlarged detail view of the bail, which is shown made of a single blank of metal which may be bent into proper shape to be attached to the scuttle.

Reference now being had to the details of the drawings by letter, A designates the coal-scuttle of the usual shape, and secured to the scuttle are the headed rivets B, the heads of which are a slight distance from the outside wall of the scuttle.

My improved bail C is made, preferably, of a blank of sheet metal having the enlarged ends, which have the slots $C'$, which are of the general shape shown, with the longitudinal extension, and the laterally-extending part of the slot, which is made, preferably, on the arc of a circle. This bail has its central portion rolled, as shown, to provide a suitable portion for engagement with the hand of the carrier and when bent into shape for attachment to the scuttle is secured thereto at each end by means of the headed rivets described. These rivets B are located one above the other on opposite sides of the bail and are guided in the slots by means of the heads of said bolts. Normally when the scuttle is not in use the bail will fall by gravity to its lowest limit and the upper of the two rivets will be guided laterally in the upper portion of the slot and the bail will fall back against the top of the scuttle. When it is desired to carry the hod and it is not desired to allow the contents of the scuttle to spill out, the handle being brought to a vertical position, the two rivets will engage in the longitudinal part of the slot on each side, and the edges of the longitudinal part of the slot bearing against the diametrically opposite edges of the shank portions of the rivets will prevent the scuttle from tilting, it being held rigid while being carried, and the moment the scuttle is set down the bail will assume its normal position, as shown in Fig. 2 of the drawings, as will be clearly understood.

While I have shown my improved bail as connected to a coal-scuttle, it will be understood that it will be applicable to any kind of a receptacle in which a rigid joint is desired to be had.

Having thus described my invention, what I claim to be new, and desire to secure by Letters Patent, is—

1. A rigid joint for bails for coal-scuttles and other receptacles, consisting in combination with the scuttle, of two headed rivets mounted one above the other, and the bail having a longitudinal slot terminating at its inner end in a transversely-disposed slotted portion on the arc of a circle, by the outlines of which slot the rivets are guided, as set forth.

2. In combination with a coal-scuttle or other receptacle, headed rivets mounted one above the other on said receptacle, a bail having ends which are slotted as described, and adapted to support the scuttle by engagement with the lower of the rivets, and be held rigid by the upper of the said rivets, while the receptacle is being carried, but allowed to tilt when the scuttle is set down, as described.

In testimony whereof I affix my signature in presence of two witnesses.

BENNETT F. SEIBERT.

Witnesses:
EUGENE J. TOBIAS,
CARL F. SEGESMAN.